United States Patent
Tang

(10) Patent No.: US 10,679,364 B2
(45) Date of Patent: Jun. 9, 2020

(54) IMAGE MATCHING METHOD, IMAGE MATCHING APPARATUS, IMAGE MATCHING SYSTEM, AND STORAGE MEDIUM

(71) Applicant: BOE TECHNOLOGY GROUP CO., LTD., Beijing (CN)

(72) Inventor: Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 15/750,977

(22) PCT Filed: Jul. 4, 2017

(86) PCT No.: PCT/CN2017/091581
§ 371 (c)(1),
(2) Date: Feb. 7, 2018

(87) PCT Pub. No.: WO2018/099077
PCT Pub. Date: Jun. 7, 2018

(65) Prior Publication Data
US 2019/0266737 A1 Aug. 29, 2019

(30) Foreign Application Priority Data
Dec. 1, 2016 (CN) .......................... 2016 1 1094077

(51) Int. Cl.
*G06K 9/32* (2006.01)
*G06T 7/33* (2017.01)
*G06K 9/00* (2006.01)

(52) U.S. Cl.
CPC ................ *G06T 7/337* (2017.01); *G06K 9/00* (2013.01); *G06K 9/00087* (2013.01); *G06T 7/33* (2017.01)

(58) Field of Classification Search
CPC ........... G06T 2207/30004; G06T 7/337; G06T 7/0014; G06K 9/6202; A61B 2017/00084
USPC .......................................... 382/294, 128–134
See application file for complete search history.

(56) References Cited

U.S. PATENT DOCUMENTS 9,418,427 B2 * 8/2016 Piper ..................... G06T 7/0014
2010/0158342 A1 6/2010 Iizuka

FOREIGN PATENT DOCUMENTS

| CN | 1619574 A | 5/2005 |
| CN | 101276411 A | 10/2008 |
| CN | 101414350 A | 4/2009 |
| CN | 103294987 A | 9/2013 |

(Continued)

OTHER PUBLICATIONS

International Search Report dated Oct. 11, 2017.

*Primary Examiner* — Charlotte M Baker
(74) *Attorney, Agent, or Firm* — Dilworth & Barrese, LLP.; Michael J. Musella, Esq.

(57) ABSTRACT

This application provides an image matching method, an image matching apparatus, an image matching system, and a storage medium, the image matching method includes: an extension step of extending an original reference image into one or more extended reference images, wherein the one or more extended reference images is obtained by deforming the original reference image; and an image matching step of image-matching a detected image with candidate reference images that include the original reference image and the one or more extended reference images.

15 Claims, 7 Drawing Sheets

(56) References Cited

FOREIGN PATENT DOCUMENTS

| | | |
|---|---|---|
| CN | 105741297 A | 7/2016 |
| CN | 105760879 A | 7/2016 |
| WO | 2010092952 A1 | 8/2010 |

* cited by examiner

200

S201:
an extension step of extending an original reference image into one or more extended reference images

S202:
an image matching step of image-matching a detected image with candidate reference images that includes the original reference image and the one or more extended reference images

S301:
an extension step of obtaining the one or more extended reference images by compressing the original reference image in one or more different directions with a predetermined compression coefficient, or by magnifying the original reference image in directions vertical to the one or more different directions by a reciprocal of the predetermined compression coefficient

S302:
an image matching step of image-matching a detected image with candidate reference images that includes the original reference image and the one or more extended reference images

S401:
an extension step of extending an original reference image into one or more extended reference images

S402:
an image matching step of image-matching a detected image with candidate reference images that includes the original reference image and the one or more extended reference images

S403:
a homography matrix calculation step of calculating, based on a result of the image matching, a homography matrix between the detected image and the matched original reference image or the extended reference image

S404:
an imaging direction angle determination step of determining, based on the homography matrix, an imaging direction angle of the detected image

S405:
a selection step of, in a case where image matching is performed on a successive detected image in a next frame, selecting, based on the imaging direction angle, one reference image that corresponds to the imaging direction angle in the candidate reference images as a reference image for image matching

FIG. 4

IMAGE MATCHING METHOD, IMAGE MATCHING APPARATUS, IMAGE MATCHING SYSTEM, AND STORAGE MEDIUM

TECHNICAL FIELD

Embodiments of the present disclosure relate to image matching method, image matching apparatus, image matching system, and storage medium.

BACKGROUND

In the field of image processing, image matching refers to that a reference image is inputted in advance, thereafter a detected image is matched with the reference image, a pattern from the reference image is detected in the detected image, and a homography matrix necessary for coordinate transform between the detected image and the reference image is obtained. Image matching can be used in augmented reality, target detection, autonomous driving, missile-end visual precision guidance, and other application fields. At present, there are many existing feature detection algorithms that are robust to image transform and scaling and therefore can be used for image matching. However, these traditional feature detection algorithms usually have no robustness to distortion of images captured at large tilt angles, images captured at large tilt angles therefore will show deformation with a disproportionate aspect ratio, resulting in a failure of the existing feature matching algorithms.

SUMMARY

According to an aspect of the present disclosure, an embodiment provides an image matching method, comprising: an extension step of extending an original reference image into one or more extended reference images, the one or more extended reference images being obtained by deforming the original reference image; and an image matching step of image-matching a detected image with candidate reference images that include the original reference image and the one or more extended reference images.

According to another aspect of the present disclosure, an embodiment provides an image matching apparatus, comprising: an extension unit configured to extend an original reference image into one or more extended reference images, the one or more extended reference images being obtained by deforming the original reference image; and an image matching unit configured to image-match a detected image with candidate reference images that include the original reference image and the one or more extended reference images.

According to yet another aspect of the present disclosure, an embodiment provides an image matching system, comprising: a processor; a memory coupled to the processor and having executable codes stored therein, and an image matching method comprising the following steps is executed when the executable codes are run by the processor: an extension step of extending an original reference image into one or more extended reference images, the one or more extended reference images being obtained by deforming the original reference image; and an image matching step of image-matching a detected image with candidate reference images that include the original reference image and the one or more extended reference images.

According to still yet another aspect of the present disclosure, an embodiment provides a storage medium having executable instructions stored therein, and the method as described above is performed when the executable instructions are run by a processor.

The embodiments of the present disclosure adopt the method of extending the reference image to improve a success rate of image matching and selecting an optimal reference image by using the imaging direction angle of images, thereby achieve reliable image matching at large tilt angles without increasing calculation complexity.

BRIEF DESCRIPTION OF THE DRAWINGS

In order to describe the technical solutions in the embodiments of the present disclosure more clearly, the accompanying drawings of the embodiments will be introduced briefly below. Apparently, the accompanying drawings in the following description relate to only some embodiments of the present disclosure, rather than to limit the present disclosure.

FIG. 2 schematically shows a flowchart of an image matching method according to an embodiment of the present disclosure.

FIG. 3 schematically shows a flowchart of an image matching method according to an embodiment of the present disclosure.

FIG. 4 schematically shows a flowchart of an image matching method according to an embodiment of the present disclosure.

DETAILED DESCRIPTION OF THE EMBODIMENTS

Now referring in detail to specific embodiments of the present disclosure, examples of which are illustrated in the accompanying drawings. Although the present disclosure will be described in conjunction with the specific embodiments, it will be understood that it is not intended to limit the present disclosure to the described embodiments. To the contrary, it is intended to cover alternatives, modifications, and equivalents included within the spirit and scope of the present disclosure as defined by the appended claims. It should be noted that the method steps described herein may be implemented by any functional blocks or functional arrangements, and any functional blocks or functional arrangements described herein may be implemented as either a physical entity or as a logic entity or as a combination of both.

Because the traditional feature detection algorithms usually have no robustness to distortion of images captured at large tilt angles, images captured at large tilt angles may show deformation with a disproportionate aspect ratio, resulting in a failure of the existing feature matching algorithms. Common solution to this is improving the feature extraction and feature matching algorithms. Although the existing improved algorithms have already raised the matching robustness for images captured at large tilt angles to a certain extent, they sacrifice an overall differentiation of features, resulting in a decrease of robustness of feature matching in other aspects. In addition, complexity of the algorithms is also greatly increased, which is disadvantageous for performing image matching in real time.

In order to enable a person skilled in the art to better understand the present disclosure, the present disclosure is further described in detail below with reference to the accompanying drawings and the specific embodiments.

It should be noted that the example to be described below is merely one specific example, and not intended to limit the embodiments of the present disclosure to the specific shown and described shapes, hardware, connection relationships, steps, values, conditions, data, orders, etc. A person skilled in the art can apply the inventive concept of the present disclosure to construct more embodiments not mentioned in this specification by reading this specification.

Figure 1A:
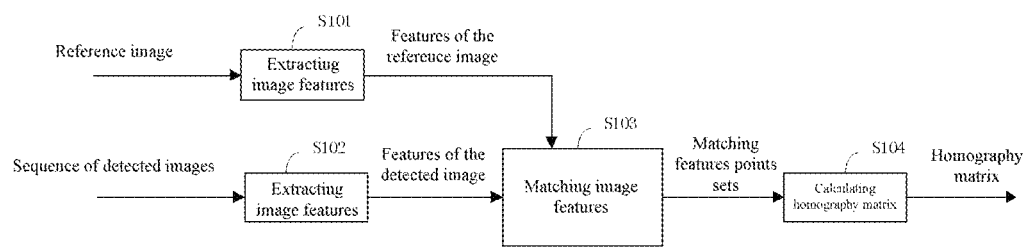
FIG. 1A schematically shows a flowchart of the conventional image matching.

FIG. 1A schematically shows a flowchart of the conventional image matching.

As shown in FIG. 1A, the conventional image matching system extracts features with respect to the reference image and the detected image, respectively (steps S101 and S102), so as to obtain features of the reference image and features of the detected image, respectively, and then obtains a set of matched feature points by matching the image features (step S103), and finally, a homography matrix for coordinate transform between the reference image and the detected image is obtained by calculating according to the set of matched feature points (step S104). In computer vision, plane homography is defined as projection mapping from one plane to another, therefore, a homography matrix for coordinate transform between the reference image and the detected image can be calculated to find a transform matrix used by projection mapping from the detected image to the reference image or from the reference image to the detected image.

Figure 1B:
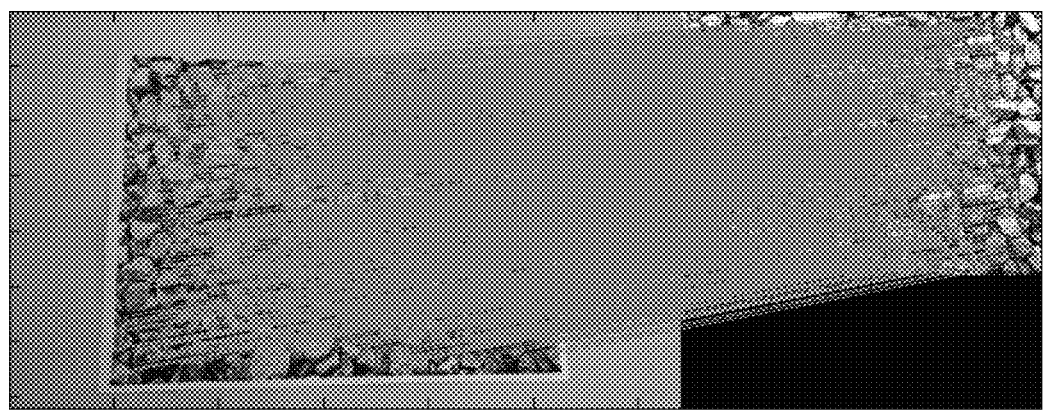
FIG. 1B schematically shows a physical map of the conventional image matching.

FIG. 1B schematically shows a physical map of the conventional image matching.

As shown in FIG. 1B, in a case where the detected image on the left is an image captured at a small tilt angle, the conventional image matching method can find a large number of matched feature point pairs in the reference image on the right, and image matching can be successful.

Figure 1C:
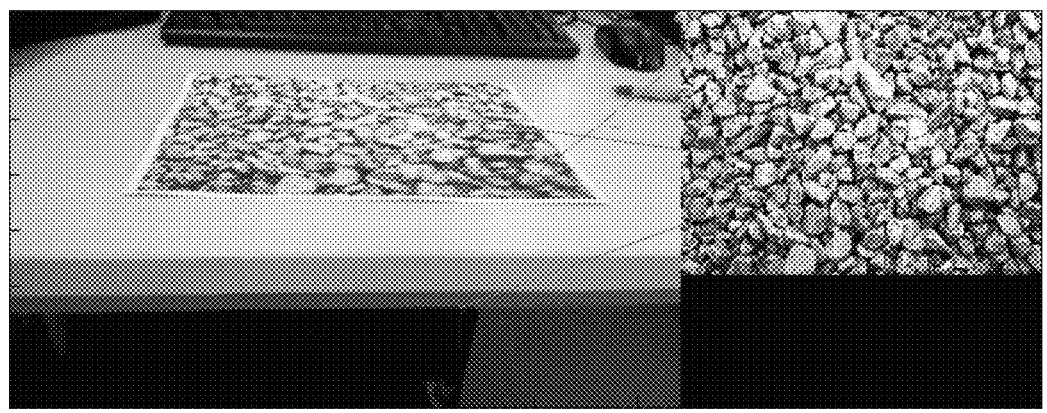
FIG. 1C schematically shows a physical map of image matching between an image captured at a large tilt angle and a reference image by the conventional image matching method.

FIG. 1C schematically shows a physical map of image matching between an image captured at a large tilt angle and a reference image by the conventional image matching method.

As shown in FIG. 1C, in a case where the detected image on the left side is an image captured at a large tilt angle, the detected image is deformed in horizontal and vertical directions due to inconsistency in the scaling ratio and there is obvious compression distortion in the vertical direction, therefore, the traditional feature matching method can only find a few matched feature point pairs in the reference image, resulting in a failure of image matching.

However, obviously, the detected image on the left and the reference image on the right should be the same image, except that the detected image on the left is an image captured at a large tilt angle, which results in some deformation and/or distortion. Therefore, the conventional image matching method cannot successfully match up to the correct reference image in the case where the detected image is an image captured at a large tilt angle.

Of course, other than image deformation and/or distortion caused in the case of capturing images at a large tilt angle, other image deformation and/or distortion may also be considered, such as image deformation and/or distortion caused by folding, clipping, twisting, damage, etc.

Accordingly, various embodiments of the present disclosure are proposed to at least increase the success rate of image matching in the case where the detected image is deformed and/or distorted.

FIG. 2 schematically shows a flowchart of an image matching method 200 according to an embodiment of the present disclosure.

The image matching method 200 shown in FIG. 2 comprises: an extension step S201 of extending an original reference image into one or more extended reference images, wherein the one or more extended reference images is obtained by deforming the original reference image; and an image matching step S202 of image-matching a detected image with candidate reference images that include the original reference image and the one or more extended reference images.

In this way, since the original detected image may already be deformed and/or distorted, the reference image with respect to which image matching is to be performed requires a proper degree of deformation (which preferably adapts to deformation of the detected image), so that the original detected image can successfully match the deformed extended reference image with a higher probability.

The method of deforming the reference image may comprise, for example, folding, shearing, compressing, magnifying, twisting, etc. Of course, such deforming may also have directivity. That is to say, performing deformation such as folding, shearing, compressing, magnifying, twisting etc. in different directions, and shapes of the deformed reference images may also be different.

Therefore, a more widely-used embodiment of deformation is given as follows to at least increase the success rate of image matching in the case where the detected image is deformed and/or distorted.

FIG. 3 schematically shows a flowchart of an image matching method 300 according to an embodiment of the present disclosure.

The image matching method 300 shown in FIG. 3 comprises: an extension step S301 of obtaining the one or more extended reference images by compressing the original reference image in one or more different directions $\alpha_1, \alpha_2 \ldots \alpha_M$ with s as a compression coefficient, or by magnifying the original reference image in directions vertical to the one or more different directions $\alpha_1, \alpha_2 \ldots \alpha_M$, i.e., $(\alpha_1+90°), (\alpha_2+90°) \ldots (\alpha_M+90°)$ by a reciprocal of the compression coefficient, i.e., $1/s$; and an image matching step S302 of image-matching a detected image with candidate reference images that include the original reference image and the one or more extended reference images. Here, $\alpha_1, \alpha_2 \ldots \alpha_M$ is an angle between each direction among M directions and a positive axis of an image abscissa, M is a positive integer, and s is the compression coefficient.

Here, the extension step S301 is defined as compressing the original reference image with a compression coefficient in one or more different directions, or magnifying the original reference image by a reciprocal of the compression coefficient in directions perpendicular to the one or more different directions. This is mainly in consideration of the case where the detected image is an image captured at a large tilt angle, deformation and distortion of the detected image can primarily be seen as compressing the original reference image with a compression coefficient in one or more different directions, or magnifying the original reference image by a reciprocal of the compression coefficient in directions perpendicular to the one or more different directions. In fact, magnification and compression are interchangeable here, and an image obtained by compressing in one direction is equivalent to an image obtained by magnifying in a direction perpendicular to said direction in terms of deformation and distortion degree, except that the dimension is different. Moreover, if compression/magnification is performed in two directions during one extension of the reference image, the behavior can be regarded as compression/magnification in one direction, while compression/magnification in the other direction can be mapped to the aforesaid direction, so that its deformation and distortion procedures are comparable, but the dimensions may be different.

Because, in real life, the detected image is an image captured at a large tilt angle belongs to a large probability event as compared with deformations such as folding, cropping, twisting, or the like, compression/magnification being uniformly performed on the reference image in a certain direction is always enough to cope with most of the deformation events, therefore, it also achieves the effect of improving the probability of successful matching to a certain extent with a relatively low degree of complexity.

In this way, after the original reference image is compressed at one or more different directions with a compression coefficient or the original reference image is magnified by a reciprocal of the compression coefficient in directions perpendicular to the one or more different directions to obtain one or more extended reference images, the deformation and/or distortion of these extended reference images may be similar to the deformation and/or distortion of the current detected image, so the success rate of image matching is improved greatly by simply extending the reference image.

Furthermore, it is considered that the current way of simply extending the reference image into one or more extended reference images can achieve a successful matching of the deformed detected image (such as the deformed detected image captured at large tilt angles), however, in the case of extending into a plurality of reference images, matching with the detected image needs to be performed separately with respect to the plurality of reference images, and the process of feature extraction and feature matching needs to be performed a plurality times, which may greatly increase calculation amount and make it difficult to perform real-time image matching. Therefore, in order to improve the speed of image matching, another embodiment of the present disclosure is introduced below, in which an imaging direction angle (i.e., how the image is deformed) of the image is calculated by using a homography matrix that matches with the previous image, so that the most proper extended reference image is automatically selected from the plurality of extended reference images during image matching in a subsequent frame, accordingly, only one extended reference image needs to be matched with to achieve image matching, which reduces calculation amount and calculation time and ensures that the entire system can perform real-time image matching.

FIG. 4 schematically shows a flowchart of an image matching method 400 according to an embodiment of the present disclosure.

The image matching method 400 as shown in FIG. 4 comprises: an extension step S401 of extending an original reference image into one or more extended reference images, wherein the one or more extended reference images is obtained by deforming the original reference image; an image matching step S402 of image-matching a detected image with candidate reference images that include the original reference image and the one or more extended reference images; a homography matrix calculation step S403 of calculating, based on a result of the image matching, a homography matrix between the detected image and the matched original reference image or extended reference image; an imaging direction angle determination step S404 of determining, based on the homography matrix, an imaging direction angle of the detected image; a selection step S405 of, in a case where image-matching is performed on a successive detected image in a next frame, selecting, based on the imaging direction angle, one reference image that corresponds to the imaging direction angle in the candidate reference images as a reference image for image matching.

For example, in a case where continuous video frames are inputted, a degree of image deformation of the detected image in a previous frame and a degree of image deformation of the detected image in a next frame are generally similar, therefore, using this characteristic, by calculating the homography matrix with respect to the extended reference image that successfully matches with the detected image in a previous frame, then calculating the imaging direction angle of the detected image (i.e., how the detected image is deformed) during photographing from the homography matrix, for example, the camera shoots upward by 90° (e.g., the left view in FIG. 1C), then one extended reference image (e.g., a reference image that is compressed to half upwardly) corresponding to that the camera tilts upwardly with an angle of 90° may be used during image matching in a next frame, the matching success rate can be improved and the calculation amount can be reduced, which saves calculation time and enables real-time image matching.

For example, in an embodiment, the selection step S405 may comprise: in a case where there is an imaging direction angle obtained for the detected image in a previous frame, selecting one reference image that corresponds to the imaging direction angle in the candidate reference images as a reference image for image matching; and in a case where there is no imaging direction angle obtained for the detected image in a previous frame, taking the original reference image as a reference image for image matching. While the image matching step S402 may comprise: extracting image features of the detected image and the reference image for image matching; and performing image matching based on the image features.

The case where there is no imaging direction angle obtained for the detected image in a previous frame may include the situation that the tilt angle=0 and the azimuth angle=0.

In this way, in the absence of an imaging direction angle obtained for the detected image in a previous frame, it is indicated that the detected image may probably not be deformed and/or distorted, so that image matching may continue using the original reference image.

For example, in an embodiment, the homography matrix calculation step S403 may comprise an adjustment step of, in a case where the detected image and the extended reference image are image-matched, after a homography matrix between the detected image and the matched extended reference image is calculated based on a result of the image matching, adjusting the homography matrix into an adjusted homography matrix between the detected image and the original reference image according to an extension process of the extended reference image. This is because the extended reference image is obtained by deforming the original reference image, so the homography matrix is a transform between coordinates of the detected image and the extended reference image, therefore, the homography matrix should be rectified to be a transform between coordinates of the detected image and the original reference image.

For example, in an embodiment, the adjustment step may comprise:

$$N_{reg} = N \times \begin{bmatrix} \cos(\alpha) & -\sin(\alpha) & 0 \\ \sin(\alpha) & \cos(\alpha) & 0 \\ 0 & 0 & 1 \end{bmatrix} \times \begin{bmatrix} s & 0 & 0 \\ 0 & 1 & 0 \\ 0 & 0 & 1 \end{bmatrix} \times \begin{bmatrix} \cos(\alpha) & \sin(\alpha) & 0 \\ -\sin(\alpha) & \cos(\alpha) & 0 \\ 0 & 0 & 1 \end{bmatrix} =$$

$$N \times \begin{bmatrix} \frac{1+s-(1-s)\cos(2\alpha)}{2} & \frac{(s-1)\sin(2\alpha)}{2} & 0 \\ \frac{(s-1)\sin(2\alpha)}{2} & \frac{1+s+(1-s)\cos(2\alpha)}{2} & 0 \\ 0 & 0 & 1 \end{bmatrix},$$

where $N_{reg}$ is an adjusted homography matrix, N is a homography matrix between the detected image and the matched extended reference image, $\alpha$ is an angle between a compression direction of the matched extended reference image and a positive axis of an image abscissa, and s is a compression coefficient of the matched extended reference image in the compression direction.

Here, if the compression direction and the compression coefficient applied when the reference image is extended are known, the homography matrix can be adjusted accordingly into the homography matrix between the detected image and the original reference image.

In an embodiment, the imaging direction angle determination step S404 may comprise: determining a rotation vector of a camera based on a relationship between the homography matrix and a camera focal length, a rotation vector of camera external parameters in horizontal and vertical axis directions, a translation vector of the camera external parameters; and determining the imaging direction angle based on the rotation vector of the camera and according to a relationship between the rotation vector of the camera and the imaging direction angle.

In an embodiment, the one or more extended reference images $IR_1$, $IR_2$ ... $IR_M$ are obtained by compressing the original reference image $IR_0$ with a coefficient s in M different directions, M is a positive integer here, wherein correspondence between the imaging direction angle and the candidate reference images includes: the imaging direction angle at which the tilt angle $\varphi$ is less than or equal to a tilt angle threshold corresponds to the original reference image $IR_0$; when the tilt angle $\varphi$ is greater than the tilt angle threshold and the azimuth $\theta$ falls into one of the M different directions and a range vicinity thereof, the imaging direction angle corresponds to the extended reference image to which said one direction among the M different directions corresponds.

Here, since the deformation may be regarded as small if the tilt angle is less than or equal to the tilt threshold, the original reference image may be used for image matching, and image deformation may be considered as relatively large only when the tilt angle is greater than the tilt threshold, the original reference image needs to be transformed for image matching. In this way, also, calculation resources are saved, and calculation efficiency is improved.

In an embodiment, correspondence between the imaging direction angle and the candidate reference images may include:

| Reference image | Tilt angle $\varphi$ | Azimuth $\theta$ |
|---|---|---|
| $IR_0$ | $\left(0° \sim \frac{\arccos(s)}{2}\right)$ | Arbitrary |
| $IR_1$ | $\left(\frac{\arccos(s)}{2} \sim 90°\right)$ | $\left(\alpha_1 - \frac{90°}{M} \sim \alpha_1 + \frac{90°}{M}\right)$ <br> $\left(\alpha_1 + 180° - \frac{90°}{M} \sim \alpha_1 + 180° + \frac{90°}{M}\right)$ |
| $IR_2$ | $\left(\frac{\arccos(s)}{2} \sim 90°\right)$ | $\left(\alpha_2 - \frac{90°}{M} \sim \alpha_2 + \frac{90°}{M}\right)$ <br> $\left(\alpha_2 + 180° - \frac{90°}{M} \sim \alpha_2 + 180° + \frac{90°}{M}\right)$ |
| ... | ... | ... |
| $IR_M$ | $\left(\frac{\arccos(s)}{2} \sim 90°\right)$ | $\left(\alpha_M - \frac{90°}{M} \sim \alpha_M + \frac{90°}{M}\right)$ <br> $\left(\alpha_M + 180° - \frac{90°}{M} \sim \alpha_M + 180° + \frac{90°}{M}\right)$ | where $\alpha_1, \alpha_2 \ldots \alpha_M$ is an angle between each direction among the M directions and a positive axis of an image abscissa.

In an embodiment, M=4, s=0.5. The angles between the M different directions and the positive axis of the image abscissa include 0°, 45°, 90°, and 135° with a range of ±22.5°, the tilt angle threshold is 30°. That is, when reducing the original reference image by ½ in the four directions as shown in FIG. 6B, most of requirements for image matching of the detected image in the case of being captured at a large tilt angle can already be satisfied, it is possible to save the number of the extended reference images and the corresponding calculation amount and calculation time.

In an embodiment, determining a rotation vector of a camera based on a relationship between the homography matrix and a camera focal length, a rotation vector of camera external parameters in horizontal and vertical axis directions, a translation vector of camera external parameters may comprise: converting the relationship between the homography matrix and a camera focal length, a rotation vector of camera external parameters in horizontal and vertical axis directions, a translation vector of camera external parameters into two equations:

$$\begin{cases} k^2(N_{11}N_{12} + N_{21}N_{22}) + N_{31}N_{32} = 0 \\ k^2(N_{11}^2 + N_{21}^2 - N_{12}^2 + N_{22}^2) = N_{32}^2 - N_{31}^2 \end{cases};$$

Since there is only one solution parameter for the above two equations, the least squares approach is thus used to solve the above two equations to obtain the parameter k.

In the solving process, if $(N_{11}N_{12}+N_{21}N_{22})$ and $(N_{11}^2+N_{21}^2-N_{12}^2+N_{22}^2)$ are close to 0 (zero), it is determined that the tilt angle φ is 0° and the azimuth θ is 0°.

In an embodiment, determining a rotation vector of a camera based on a relationship between the homography matrix and a camera focal length, a rotation vector of camera external parameters in horizontal and vertical axis directions, a translation vector of camera external parameters comprises: after determining the parameter k, normalizing the column vector $$\begin{pmatrix} kN_{11} \\ kN_{21} \\ N_{31} \end{pmatrix}$$

into an amplitude of 1 (one), thus obtaining an X-axis rotation vector $$\begin{pmatrix} V_{11} \\ V_{21} \\ V_{31} \end{pmatrix}$$

of the camera; normalizing the column vector $$\begin{pmatrix} kN_{12} \\ kN_{22} \\ N_{32} \end{pmatrix}$$

into an amplitude of 1 (one), thus obtaining a Y-axis rotation vector $$\begin{pmatrix} V_{12} \\ V_{22} \\ V_{32} \end{pmatrix}$$

of the camera; and calculating a vector cross-product of $$\begin{pmatrix} V_{11} \\ V_{21} \\ V_{31} \end{pmatrix} \text{ and } \begin{pmatrix} V_{12} \\ V_{22} \\ V_{32} \end{pmatrix},$$

thus obtaining a Z-axis rotation vector $$\begin{pmatrix} V_{13} \\ V_{23} \\ V_{33} \end{pmatrix}$$

of the camera.

In an embodiment, the relationship between the homography matrix and a camera focal length, a rotation vector of camera external parameters in horizontal and vertical axis directions, a translation vector of camera external parameters includes:

$$\begin{bmatrix} N_{11} & N_{12} & N_{13} \\ N_{21} & N_{22} & N_{23} \\ N_{31} & N_{32} & 1 \end{bmatrix} = \frac{1}{W_z} \begin{bmatrix} \frac{1}{k} & 0 & 0 \\ 0 & \frac{1}{k} & 0 \\ 0 & 0 & 1 \end{bmatrix} \begin{bmatrix} V_{11} & V_{12} & W_x \\ V_{21} & V_{22} & W_y \\ V_{31} & V_{32} & W_z \end{bmatrix}$$

where $$\begin{bmatrix} N_{11} & N_{12} & N_{13} \\ N_{21} & N_{22} & N_{23} \\ N_{31} & N_{32} & 1 \end{bmatrix}$$

is the homography matrix, the parameter k is the camera focal length, the parameter $$\begin{bmatrix} V_{11} & V_{12} \\ V_{21} & V_{22} \\ V_{31} & V_{32} \end{bmatrix}$$

is the rotation vector of camera external parameters in horizontal and vertical axis directions, the parameter $$\begin{bmatrix} W_x \\ W_y \\ W_z \end{bmatrix}$$

is the translation vector of camera external parameters, wherein the relationship between the rotation vector of the camera and the imaging direction angle includes:

$$\begin{cases} \varphi = \arccos(V_{33}) \\ \theta = \arctan\left(\frac{V_{23}}{V_{13}}\right) \end{cases},$$

where φ is a tilt angle in the imaging direction angle and θ is an azimuth angle in the imaging direction angle.

In this way, the imaging direction angle of the image during photographing (e.g., the tilt angle φ and the azimuth angle θ included in the imaging direction angle) is calculated by using a homography matrix matched with the previous image, so as to automatically select the most proper extended reference image from among the plurality of extended reference images during image matching for a subsequent frame, so image matching can be achieved only needing to match with one extended reference image, which reduces calculation amount and calculation time, and ensures that the entire system can perform real-time image matching.

In the following, a specific embodiment of the present disclosure will be described so as to explain implementation process of the present solution in more detail and completeness.

Figure 5:
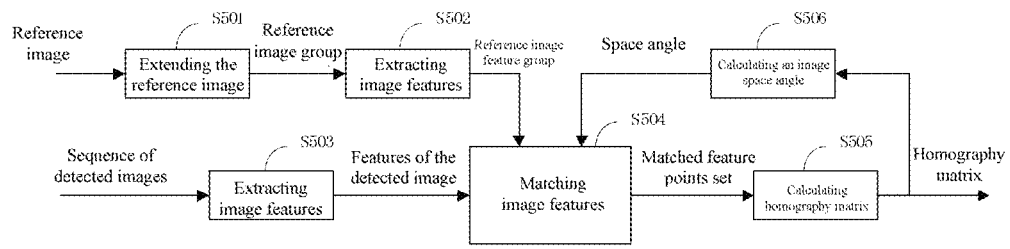
FIG. 5 schematically shows a flowchart of an image matching method according to an embodiment of the present disclosure.

FIG. 5 schematically shows a flowchart of an image matching method 500 according to an embodiment of the present disclosure.

Different from the conventional image matching solution as shown in FIG. 1A, two functional modules of "extending the reference image S501" and "calculating the imaging direction angle S506" are added in the solution of this embodiment. The other steps S502 to S505 all correspond to S101 to S104 in FIG. 1A. The purpose of "extending the reference image" is to improve the success rate of image matching in the case of large angle tilt. Large angle tilt causes the detected image to show compression distortion in a certain direction, a better matching result can be obtained by deforming the reference image in a plurality of directions in advance, such as performing compression distortion, then using the reference image that has compression distortion in a similar direction to match with the detected image. Of course, extending the reference image will increase the number of times of image matching, a substantial increase in calculation amount makes it difficult to achieve real-time calculation, thus the imaging direction angle is calculated according to the homography matrix obtained by matching of the previous detected image, the imaging direction angle is used as a guide to automatically select the most proper reference image in a subsequent frame, so as to avoid that a plurality of times of image matching is performed on the same frame of detected image, which effectively reduces calculation amount, improves calculation speed, so that real-time image matching can be achieved.

Figure 6A:
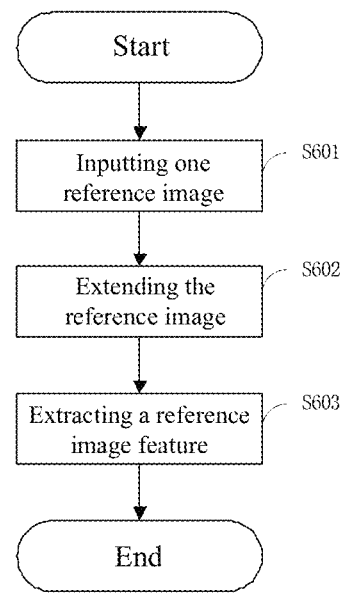
FIG. 6A schematically shows a flowchart of an image pre-processing procedure in the image matching method shown in FIG. 5.
Figure 6B:
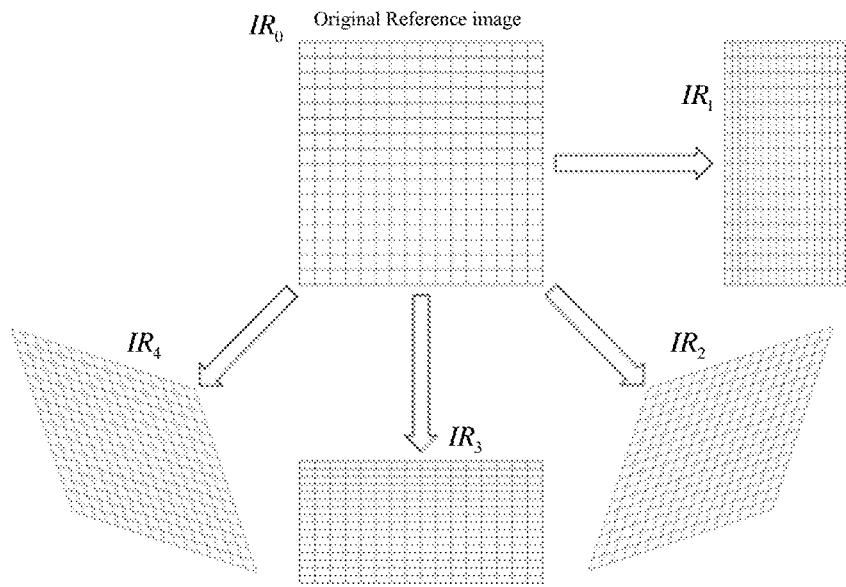
FIG. 6B schematically shows a schematic diagram of a plurality of extended reference images obtained during an image pre-processing procedure.

FIG. 6A schematically shows a flowchart of an image pre-processing procedure in the image matching method shown in FIG. 5.

As shown in FIG. 6A, the pre-processing (i.e., extension) flow of the reference image comprises: first, one reference image is inputted (step S601); then the reference image is extended to obtain a reference image group (step S602); and finally, the reference images in the reference image group is subjected to image feature extraction, respectively (step S603).

Here, preferably, it is adopted that the original reference image is compressed in M different directions $\alpha_1, \alpha_2 \ldots \alpha_M$ with s as a compression coefficient, or the original reference image is magnified in directions $(\alpha_1+90°), (\alpha_2+90°) \ldots (\alpha_M+90°)$ perpendicular to the M different directions by the reciprocal of the compression coefficient, i.e., 1/s. Here, M is assumed to be 4, s=½, the angle $\alpha_1, \alpha_1 \ldots \alpha_4$ between the four different directions and the positive axis of the image abscissa is 0°, 45°, 90°, 135°.

Thus, four extended reference images obtained are as shown in FIG. 6B.

FIG. 6B schematically shows a schematic diagram of a plurality of extended reference images obtained during an image pre-processing procedure.

For example, the inputted original reference image is transformed to generate an extended reference image. The original reference image is denoted by $IR_0$ shown in the upper side of FIG. 6B, $IR_0$ is compressed with ½ in the horizontal direction to obtain a reference image with compression distortion in the horizontal direction, it is denoted by $IR_1$ as shown in the right side of FIG. 6B; $IR_0$ is compressed with ½ in the 135° direction to obtain a reference image with compression distortion in the 135° direction, it is denoted by as shown in the lower right side of FIG. 6B; $IR_0$ is compressed with ½ in the vertical direction to obtain a reference image with compression distortion in the vertical direction, it is denoted by $IR_3$ as shown in the lower side of FIG. 6B; $IR_0$ is compressed with ½ in the 45° direction to generate a reference image with compression distortion in the 45° direction, it is denoted by $IR_4$ as shown in the lower left of FIG. 6B.

Of course, these directions and coefficients for extending the reference image are only examples. In practice, the directions and coefficients for extending the reference image may also be other values, which are not shown here in detail.

In this way, a reference image group $IR_k$ (k=0 to 4) including five reference images as shown in FIG. 6B is obtained by extending the original reference image.

Figure 7A:
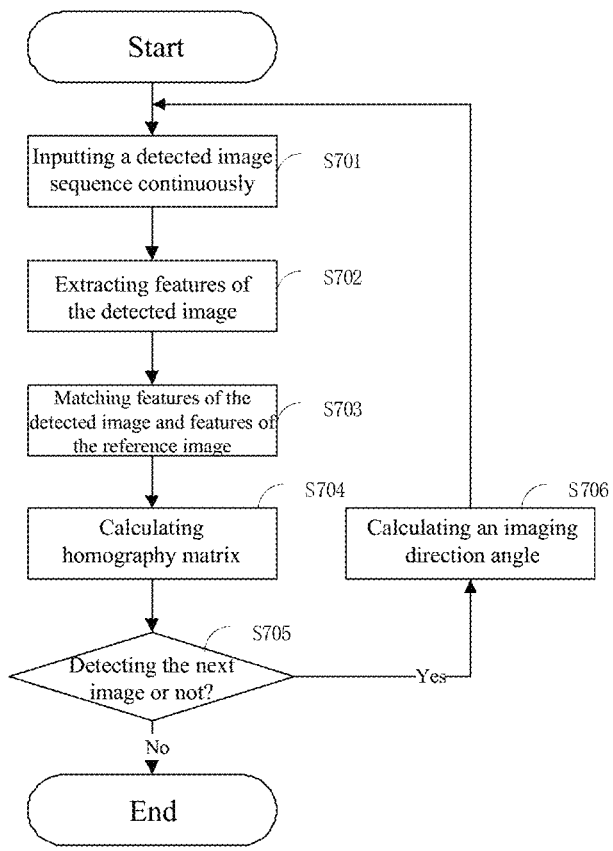
FIG. 7A schematically shows a flowchart of the image matching process in the image matching method shown in FIG. 5.

FIG. 7A schematically shows a flowchart of the image matching process in the image matching method shown in FIG. 5.

The image matching process is as follows: first, a detected image sequence is inputted continuously (step S701), then the detected image is subjected to feature extraction (step S702), thereafter features of the detected image and features of the reference image are matched (step S703), and the homography matrix is calculated (S704), it is determined in step S705 whether it is necessary to continue matching the next detected image; if it is still necessary to continue matching the next detected image, an imaging direction angle is calculated (step S706), and it jumps to inputting the next detected image, otherwise the image matching operation is ended.

For example, in step S702, feature extraction is performed on the reference image or the detected image sequence, and the extracted features are some stable feature points on the image and descriptors of the feature points. A variety of traditional feature extraction algorithms may be used here, if the feature algorithms have robustness to translation, rotation, scaling, SIFT algorithm is recommended, SURF algorithm, FAST algorithm, and so on may also be used. For the reference image group $IR_k$ (k=0 to 4), the reference image feature group $FR_k$ (k=0 to 4) is obtained by feature extraction. As for the detected image $IT_n$ (n≥0), the detected image feature group $FT_n$ (n≥0) is obtained by feature extraction.

In step S703, reference image features that match with detected image features are calculated by using the feature matching algorithm corresponding to the feature extraction algorithm to obtain a set of all matched feature point pairs. Some of matched point pairs obtained by feature matching are mismatched, RANSAC algorithm may be used to remove those wrongly matched and retain the feature points correctly matched, the specific steps are as follows:

Step 1, an Optimal Reference Image is Selected.

For a certain inputted detected image $IT_n$, in order to ensure successful matching of the image, it is necessary to select the corresponding reference image $IR_k$ from the reference image group to match with according to the imaging direction angle of the detected image. However, the imaging direction angle of the detected image is unknown. A simple method is to match the detected image with all the reference images separately, the reference image with the largest number of matched feature points is selected. Although this method can select the most proper reference image, image matching needs to be performed for a plurality of times, calculation amount is too large, it is hard to achieve real-time calculation.

In consideration of that the inputted image sequence is continuous in terms of the imaging direction angle, the imaging direction angle of the previous detected image $IT_{n-1}$ can be used to approximate the imaging direction angle of $IT_n$, thereby select the proper reference image. Table 1 gives a range of the imaging direction angle corresponding to each reference image.

The reference image may be selected according to Table 1 below.

| Reference image | Tilt angle $\varphi$ | Azimuth angle $\theta$ |
|---|---|---|
| $IR_0$ | (0°~30°) | Arbitrary |
| $IR_1$ | (30°~90°) | (−22.5°~22.5°) (157.5°~202.5°) |
| $IR_2$ | (30°~90°) | (112.5°~157.5°) (292.5°~337.5°) |
| $IR_3$ | (30°~90°) | (67.5°~112.5°) (247.5°~292.5°) |
| $IR_4$ | (30°~90°) | (22.5°~67.5°) (202.5°~247.5°) |

It should be noted that compression distortion is preferably performed in four directions of 0°, 135°, 90°, and 45°, and a recommended value of the compression coefficient is 0.5. If other M directions $\alpha_1, \alpha_2, \ldots, \alpha_M$ are used for compression distortion and s is used as the compression coefficient, the reference image is selected with reference to Table 2.

| Reference image | Tilt angle $\varphi$ | Azimuth angle $\theta$ |
|---|---|---|
| $IR_0$ | $\left(0° \sim \frac{\arccos(s)}{2}\right)$ | Arbitrary |
| $IR_1$ | $\left(\frac{\arccos(s)}{2} \sim 90°\right)$ | $\left(\alpha_1 - \frac{90°}{M} \sim \alpha_1 + \frac{90°}{M}\right)$ $\left(\alpha_1 + 180° - \frac{90°}{M} \sim \alpha_1 + 180° + \frac{90°}{M}\right)$ |
| $IR_2$ | $\left(\frac{\arccos(s)}{2} \sim 90°\right)$ | $\left(\alpha_2 - \frac{90°}{M} \sim \alpha_2 + \frac{90°}{M}\right)$ $\left(\alpha_2 + 180° - \frac{90°}{M} \sim \alpha_2 + 180° + \frac{90°}{M}\right)$ |
| ... | ... | ... |
| $IR_M$ | $\left(\frac{\arccos(s)}{2} \sim 90°\right)$ | $\left(\alpha_M - \frac{90°}{M} \sim \alpha_M + \frac{90°}{M}\right)$ $\left(\alpha_M + 180° - \frac{90°}{M} \sim \alpha_M + 180° + \frac{90°}{M}\right)$ |

Of course, the above step 1 is performed in the case where the imaging direction angle of the previous frame has been calculated. If the imaging direction angle of the previous frame is not calculated, all the reference images (including the original reference image and the extended reference images) are used directly to perform image matching separately.

Step 2, the Matched Feature Point Pairs are Calculated.

The feature matching algorithm corresponding to the feature extraction algorithm is used to calculate features of the detected image and features of the reference image to obtain a set of matched feature point pairs.

Step 3, Four Pairs of Matched Points are Selected Randomly to Calculate the Homography Matrix.

The detected image has a mapping transform relationship with the reference image, and a certain coordinate point $(x_m, y_m)$ in the reference image is mapped to a point $(x_c, y_c)$ on the detected image after going through mapping transform. The coordinate transform satisfies the following equation, wherein the transform matrix in the equation is called a homography matrix, and there are eight unknown parameters in the homography matrix.

$$h\begin{bmatrix} x_c \\ y_c \\ 1 \end{bmatrix} = \begin{bmatrix} N_{11} & N_{12} & N_{13} \\ N_{21} & N_{22} & N_{23} \\ N_{31} & N_{32} & 1 \end{bmatrix} \begin{bmatrix} x_m \\ y_m \\ 1 \end{bmatrix}$$

Given a pair of matched feature points $(x_m, y_m)$, $(x_c, y_c)$, two equations can be written out as follows:

$$\begin{bmatrix} x_m & y_m & 1 & 0 & 0 & 0 & -x_c x_m & -x_c y_m \\ 0 & 0 & 0 & x_m & y_m & 1 & -y_c x_m & -y_c y_m \end{bmatrix} \begin{bmatrix} N_{11} \\ N_{12} \\ N_{13} \\ N_{21} \\ N_{22} \\ N_{23} \\ N_{31} \\ N_{32} \end{bmatrix} = \begin{bmatrix} x_c \\ y_c \end{bmatrix}$$

According to the four pairs of matched feature points, eight equations can be written out to solve the eight parameters of the homography matrix.

Step 4, the Matched Feature Point Pairs are Calculated According to the Homography Matrix.

The set of matched point pairs is checked to calculate how many pairs of matched points use the homography matrix to perform coordinate transform, and the error is less than a threshold $\theta_{err}$. If the randomly selected four pairs of feature points are the correctly matched points, then the calculated homography matrix should be also correct, so that a large number of matched point pairs in conformity with the homography matrix can be found; on the contrary, if there is a wrongly matched point in the randomly selected four pairs of points, then the calculated homography matrix is wrong, and only a few matched point pairs in conformity with the homography matrix can be found. If the number of matched point pairs that are found is larger than a threshold $N_t$, it is considered that a correct model has been found; otherwise, it returns to "Step 3" to randomly reselect the matched points for calculation. In addition, if the number of times of reselecting the matched points exceeds a certain limit, then it is considered that the detected image does not match the reference image, the image matching operation is ended.

Step 5, Wrong Feature Point Pairs are Removed.

The matched feature point pairs not in conformity with the homography matrix are removed, and the matched feature point pairs in conformity with the homography matrix are retained and outputted.

In step S704, after a set of correctly matched point pairs is selected through RANSAC, these matched point pairs are used to solve the equation again and to calculate the homography matrix N. The homography matrix needs not to be adjusted when the original reference image $IR_0$ is selected for image matching; however, when the extended distorted reference images $IR_1$ to $IR_4$ are selected for image matching, the calculated homography matrix is for the distorted reference images and needs to be adjusted and converted into a homography matrix corresponding to the original reference image.

For the reference image $IR_t$ with compression distortion in the horizontal direction, the adjustment formula is:

$$N_{reg} = N \times \begin{bmatrix} 0.5 & 0 & 0 \\ 0 & 1 & 0 \\ 0 & 0 & 1 \end{bmatrix}$$

For the reference image $IR_2$ with compression distortion in the 135° direction, the adjustment formula is:

$$N_{reg} = N \times \begin{bmatrix} 0.75 & 0.25 & 0 \\ 0.25 & 0.75 & 0 \\ 0 & 0 & 1 \end{bmatrix}$$

For the reference image $IR_3$ with compression distortion in the vertical direction, the adjustment formula is:

$$N_{reg} = N \times \begin{bmatrix} 1 & 0 & 0 \\ 0 & 0.5 & 0 \\ 0 & 0 & 1 \end{bmatrix}$$

For the reference image $IR_4$ with compression distortion in the 45° direction, the adjustment formula is:

$$N_{reg} = N \times \begin{bmatrix} 0.75 & -0.25 & 0 \\ -0.25 & 0.75 & 0 \\ 0 & 0 & 1 \end{bmatrix}$$

The above formulas are for the cases where compression distortion is preferably performed in four directions of 0°, 135°, 90°, and 45°, and a recommended value of the compression coefficient is 0.5. If compression distortion in the other direction α is adopted, the compression coefficient is s, then the adjustment formula for the homography matrix is modified to:

$$N_{reg} = N \times \begin{bmatrix} \cos(\alpha) & -\sin(\alpha) & 0 \\ \sin(\alpha) & \cos(\alpha) & 0 \\ 0 & 0 & 1 \end{bmatrix} \times \begin{bmatrix} s & 0 & 0 \\ 0 & 1 & 0 \\ 0 & 0 & 1 \end{bmatrix} \times \begin{bmatrix} \cos(\alpha) & \sin(\alpha) & 0 \\ -\sin(\alpha) & \cos(\alpha) & 0 \\ 0 & 0 & 1 \end{bmatrix}$$

The formula may be simplified as:

$$N_{reg} = N \times \begin{bmatrix} \frac{1+s-(1-s)\cos(2\alpha)}{2} & \frac{(s-1)\sin(2\alpha)}{2} & 0 \\ \frac{(s-1)\sin(2\alpha)}{2} & \frac{1+s+(1-s)\cos(2\alpha)}{2} & 0 \\ 0 & 0 & 1 \end{bmatrix}$$

When it is determined in step S705 that the next frame of image needs to be detected, then the imaging direction angle of the detected image is calculated by the homography matrix in step S706, including two angle parameters of the title angle φ and the azimuth angle θ. The imaging direction angle may be used to select the proper reference image, so as to facilitate detecting the next frame of image. The calculation steps are as follows.

Step 1, a Camera Focal Length k is Calculated.

First, relationship between the homography matrix and the camera focal length, camera external parameters is as shown in the following formula, wherein the left side of the formula is the homography matrix, the parameter k in the right side of the formula is the camera focal length, the parameter $$\begin{bmatrix} V_{11} & V_{12} \\ V_{21} & V_{22} \\ V_{31} & V_{32} \end{bmatrix}$$

is rotation vectors of the camera external parameters in the X and Y directions, and the parameter $$\begin{bmatrix} W_x \\ W_y \\ W_z \end{bmatrix}$$

is translation vectors of the camera external parameters.

$$\begin{bmatrix} N_{11} & N_{12} & N_{13} \\ N_{21} & N_{22} & N_{23} \\ N_{31} & N_{32} & 1 \end{bmatrix} = \frac{1}{W_z} \begin{bmatrix} \frac{1}{k} & 0 & 0 \\ 0 & \frac{1}{k} & 0 \\ 0 & 0 & 1 \end{bmatrix} \begin{bmatrix} V_{11} & V_{12} & W_x \\ V_{21} & V_{22} & W_y \\ V_{31} & V_{32} & W_z \end{bmatrix}$$

In consideration of that column vectors $$\begin{pmatrix} V_{11} \\ V_{21} \\ V_{31} \end{pmatrix} \text{ and } \begin{pmatrix} V_{12} \\ V_{22} \\ V_{32} \end{pmatrix}$$

are unit vectors that are vertical to each other, thus it is derived that $$\begin{cases} V_{11}V_{12} + V_{21}V_{22} + V_{31}V_{32} = 0 \\ V_{11}^2 + V_{21}^2 + V_{31}^2 = V_{12}^2 + V_{22}^2 + V_{32}^2 \end{cases}.$$

It can be derived by inferring based on the above formula that:

$$\begin{cases} k^2(N_{11}N_{12} + N_{21}N_{22}) + N_{31}N_{32} = 0 \\ k^2(N_{11}^2 + N_{21}^2 - N_{12}^2 + N_{22}^2) = N_{32}^2 - N_{31}^2 \end{cases}$$

The least squares approach is used to solve the above two equations to obtain the parameter k, it needs to be noted that, if $(N_{11}N_{12}+N_{21}N_{22})$ and $(N_{11}^2+N_{21}^2-N_{12}^2+N_{22}^2)$ are close to 0 (zero), error of the calculation result may be relatively large, which will affect the subsequent calculation of the imaging direction angle. However, when such regression condition occurs, it indicates that the camera is directly facing a target to photograph, it may be determined that the tilt angle is close to 00, there is no need to proceed with the following steps 2 and 3, the imaging direction angle φ=0, θ=0 is directly outputted, this can save a considerable amount of calculation.

Step 2, Rotation Vectors of the Camera External Parameters are Calculated:

After the parameter k is determined, the camera external parameters may be further calculated. The following is derived by transforming the formula in step 1:

$$\begin{bmatrix} V_{11} & V_{12} & W_x \\ V_{21} & V_{22} & W_y \\ V_{31} & V_{32} & W_z \end{bmatrix} =$$

$$W_z \begin{bmatrix} k & 0 & 0 \\ 0 & k & 0 \\ 0 & 0 & 1 \end{bmatrix} \begin{bmatrix} N_{11} & N_{12} & N_{13} \\ N_{21} & N_{22} & N_{23} \\ N_{31} & N_{32} & 1 \end{bmatrix} = W_z \begin{bmatrix} kN_{11} & kN_{12} & kN_{13} \\ kN_{21} & kN_{22} & kN_{23} \\ N_{31} & N_{32} & 1 \end{bmatrix}$$

In consideration of that the vectors $$\begin{pmatrix} V_{11} \\ V_{21} \\ V_{31} \end{pmatrix} \text{ and } \begin{pmatrix} V_{12} \\ V_{22} \\ V_{32} \end{pmatrix}$$

both are unit vectors, thus the vectors $$\begin{pmatrix} kN_{11} \\ kN_{21} \\ N_{31} \end{pmatrix} \text{ and } \begin{pmatrix} kN_{12} \\ kN_{22} \\ N_{32} \end{pmatrix}$$

may be normalized, $$\begin{pmatrix} V_{11} \\ V_{21} \\ V_{31} \end{pmatrix} \text{ and } \begin{pmatrix} V_{12} \\ V_{22} \\ V_{32} \end{pmatrix}$$

are obtained by calculation.

The column vector $$\begin{pmatrix} kN_{11} \\ kN_{21} \\ N_{31} \end{pmatrix}$$

is normalized into an amplitude of 1 (one), then the X-axis rotation vector $$\begin{pmatrix} V_{11} \\ V_{21} \\ V_{31} \end{pmatrix}$$

is obtained;

The column vector $$\begin{pmatrix} kN_{12} \\ kN_{22} \\ N_{32} \end{pmatrix}$$

is normalized into an amplitude of 1 (one), then the Y-axis rotation vector $$\begin{pmatrix} V_{12} \\ V_{22} \\ V_{32} \end{pmatrix}$$

is obtained;

A vector cross-product of $$\begin{pmatrix} V_{11} \\ V_{21} \\ V_{31} \end{pmatrix} \text{ and } \begin{pmatrix} V_{12} \\ V_{22} \\ V_{32} \end{pmatrix}$$

is calculated, then the Z-axis rotation vector $$\begin{pmatrix} V_{13} \\ V_{23} \\ V_{33} \end{pmatrix}$$

is obtained.

Step 3, the Imaging Direction Angle is Calculated.

After the camera external parameters are calculated, the imaging direction angle is further calculated:

$$\begin{cases} \varphi = \arccos(V_{33}) \\ \theta = \arctan\left(\frac{V_{23}}{V_{13}}\right) \end{cases}.$$

Thereafter, it returns to step S701, which of the extended reference images is to be matched with the detected image is selected by using the calculated imaging direction angle through Table 1 or Table 2, so that calculation amount is further saved, and at the same time, the success rate of image matching can be also improved.

Figure 7B:
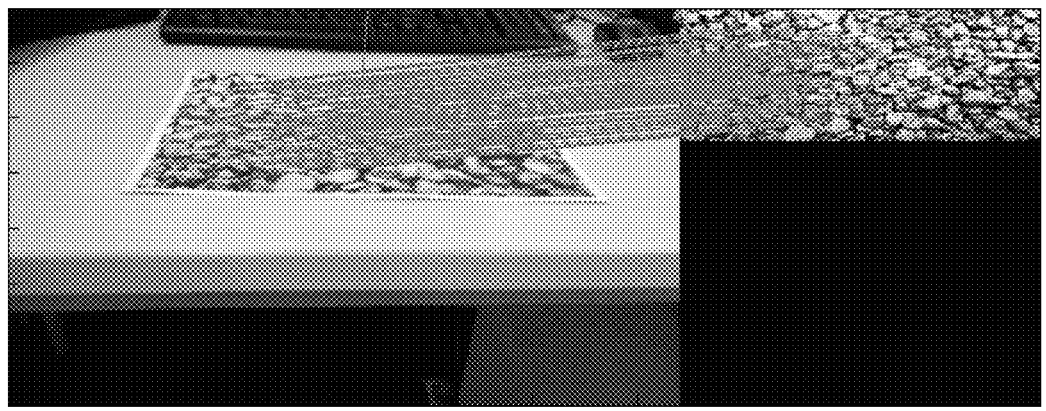
FIG. 7B schematically shows an image matching physical map obtained by the image matching process in the image matching method shown in FIG. 5.

FIG. 7B schematically shows an image matching physical map obtained by the image matching process in the image matching method shown in FIG. 5.

With the image matching method according to an embodiment of the present disclosure, as shown in FIG. 7B, an extended reference image is obtained by compression-distorting the reference image in the vertical direction, the image feature matching finds a large amount of correctly matched point pairs between the detected image and the extended reference image, so that the distorted image can also be successfully matched, thus the success rate of image matching is improved.

Figure 8:
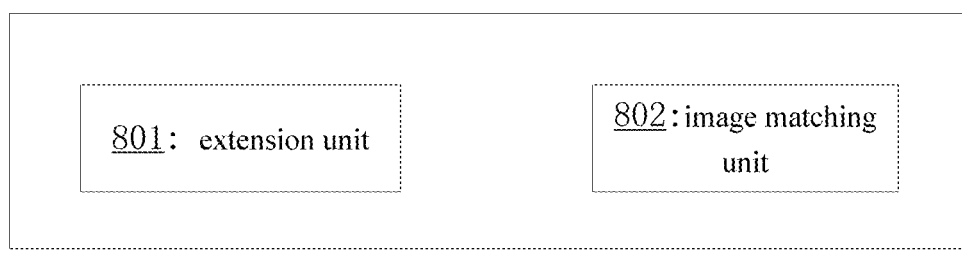
FIG. 8 schematically shows a block diagram of an image matching apparatus according to an embodiment of the present disclosure.

FIG. 8 schematically shows a block diagram of an image matching apparatus 800 according to an embodiment of the present disclosure.

The image matching apparatus 800 shown in FIG. 8 comprises an extension unit 801 configured to extend an original reference image into one or more extended reference images, wherein the one or more extended reference images is obtained by deforming the original reference image; and an image matching unit 802 configured to image-match a detected image with candidate reference images that include the original reference image and the one or more extended reference images.

In this way, since the original detected image may already be deformed and/or distorted, the reference image with respect to which image matching is to be performed requires a proper degree of deformation (which preferably adapts to deformation of the detected image), so that the original detected image can successfully match the deformed extended reference image with a higher probability.

For example, in an embodiment, the extension unit 801 may be configured to obtain the one or more extended reference images by compressing the original reference image in one or more different directions $\alpha_1, \alpha_2 \ldots \alpha_M$ with s as a compression coefficient, or by magnifying the original reference image in directions vertical to the one or more different directions $\alpha_1, \alpha_2 \ldots \alpha_M, \ldots$ , i.e., $(\alpha_1+90°)$, $(\alpha_2+90°) \ldots (\alpha_M+90°)$ by a reciprocal of the compression coefficient, i.e., 1/s. Here, $\alpha_1, \alpha_2 \ldots \alpha_M$ is an angle between each direction among M directions and a positive axis of an image abscissa, M is a positive integer, and s is the compression coefficient.

Here, the original reference image is compressed with a compression coefficient in one or more different directions, or the original reference image is magnified by a reciprocal of the compression coefficient in directions perpendicular to the one or more different directions. This is mainly in consideration of the case where the detected image is an image captured at a large tilt angle, deformation and distortion of the detected image can primarily be seen as compressing the original reference image with a compression coefficient in one or more different directions, or magnifying the original reference image by a reciprocal of the compression coefficient in directions perpendicular to the one or more different directions.

Because, in real life, the detected image is an image captured at a large tilt angle belongs to a large probability event as compared with deformations such as folding, cropping, distortion, or the like, compression/magnification being uniformly performed on the reference image in a certain direction is always enough to cope with most of the deformation events, therefore, it also achieves the effect of improving the probability of successful matching to a certain extent with a relatively low degree of complexity.

In this way, after the original reference image is compressed in one or more different directions with a compression coefficient or the original reference image is magnified by a reciprocal of the compression coefficient in directions perpendicular to the one or more different directions to obtain one or more extended reference images, deformation and/or distortion of these extended reference images may be similar to distortion and/or distortion of the current detected image, so the image matching success rate is improved greatly by simply extending the reference image.

Furthermore, in order to increase the image matching speed, the image matching apparatus 800 may further comprise: a homography matrix calculation unit configured to calculate, based on a result of the image matching, a homography matrix between the detected image and the matched original reference image or extended reference image; an imaging direction angle determination unit configured to determine, based on the homography matrix, an imaging direction angle of the detected image; and a selection unit configured to, in a case where image-matching is performed on a successive detected image in a next frame, select, based on the imaging direction angle, one reference image that corresponds to the imaging direction angle in the candidate reference images as a reference image for image matching.

For example, in a case where continuous video frames are inputted, a degree of image deformation of the detected image in a previous frame and a degree of image deformation of the detected image in a next frame are generally similar, therefore, using this characteristic, by calculating the homography matrix with respect to the extended reference image that successfully matches with the detected image in a previous frame, then calculating the imaging direction angle of the detected image (i.e., how the detected image is deformed) during photographing from the homography matrix, for example, the camera shoots upward by 90° (e.g., the left view in FIG. 1C), one extended reference image (e.g., a reference image that is compressed to half upwardly) corresponding to that the camera tilts upwardly with an angle of 90° may be used during image matching in a next frame, the matching success rate can be improved and the calculation amount can be reduced, which saves calculation time and enables real-time image matching.

For example, in an embodiment, the selection unit may be configured to: in a case where there is an imaging direction angle obtained for the detected image in a previous frame, select one reference image that corresponds to the imaging direction angle in the candidate reference images as a reference image for image matching; and in a case where there is no imaging direction angle obtained for the detected image in a previous frame, take the original reference image as a reference image for image matching. While the image matching unit may be configured to: extract image features of the detected image and the reference image for image matching; and perform image matching based on the image features.

The case where there is no imaging direction angle obtained for the detected image in a previous frame may include the situation that the tilt angle=0 and the azimuth angle=0.

In this way, in the absence of an imaging direction angle obtained for the detected image in a previous frame, it is indicated that the detected image may probably not be deformed and/or distorted, so that image matching may continue using the original reference image.

In an embodiment, the homography matrix calculation unit may be configured to perform: an adjustment step of, in a case where the detected image and the extended reference image are image-matched, after a homography matrix between the detected image and the matched extended reference image is calculated based on a result of the image matching, adjusting the homography matrix into an adjusted homography matrix between the detected image and the original reference image according to an extension process of the extended reference image. This is because the extended reference image is obtained by deforming the original reference image, so the homography matrix is for a transform between coordinates of the detected image and the extended reference image, therefore, the homography matrix should be rectified to be a transform between coordinates of the detected image and the original reference image.

For example, in an embodiment, the homography matrix calculation unit may be configured to perform calculation of the following formula:

$$N_{reg} = N \times \begin{bmatrix} \cos(\alpha) & -\sin(\alpha) & 0 \\ \sin(\alpha) & \cos(\alpha) & 0 \\ 0 & 0 & 1 \end{bmatrix} \times \begin{bmatrix} s & 0 & 0 \\ 0 & 1 & 0 \\ 0 & 0 & 1 \end{bmatrix} \times \begin{bmatrix} \cos(\alpha) & \sin(\alpha) & 0 \\ -\sin(\alpha) & \cos(\alpha) & 0 \\ 0 & 0 & 1 \end{bmatrix}$$

$$= N \times \begin{bmatrix} \dfrac{1+s-(1-s)\cos(2\alpha)}{2} & \dfrac{(s-1)\sin(2\alpha)}{2} & 0 \\ \dfrac{(s-1)\sin(2\alpha)}{2} & \dfrac{1+s+(1-s)\cos(2\alpha)}{2} & 0 \\ 0 & 0 & 1 \end{bmatrix},$$

where $N_{reg}$ is an adjusted homography matrix, N is a homography matrix between the detected image and the matched extended reference image, α is an angle between a compression direction of the matched extended reference image and a positive axis of an image abscissa, and s is a compression coefficient of the matched extended reference image in the compression direction.

Here, if the compression direction and the compression coefficient applied when the reference image is extended are known, the homography matrix can be adjusted accordingly into the homography matrix between the detected image and the original reference image.

In an embodiment, the imaging direction angle determination unit may perform the following: determining a rotation vector of a camera based on a relationship between the homography matrix and a camera focal length, a rotation vector of camera external parameters in horizontal and vertical axis directions, a translation vector of camera external parameters; and determining the imaging direction angle based on the rotation vector of the camera and according to a relationship between the rotation vector of the camera and the imaging direction angle.

In an embodiment, the one or more extended reference images $IR_1$, $IR_2$ . . . $IR_M$ are obtained by compressing the original reference image $IR_0$ with a coefficient s in M different directions, M is a positive integer here, correspondence between the imaging direction angle φ and the candidate reference images includes: the imaging direction angle at which the tilt angle φ is less than or equal to a tilt angle threshold corresponds to the original reference image $IR_0$; when the tilt angle φ is greater than the tilt angle threshold and the azimuth θ falls into one of the M different directions and a range vicinity thereof, the imaging direction angle corresponds to the extended reference image to which said one direction among the M different directions corresponds.

Here, since the deformation may be regarded as small if the tilt angle is less than or equal to the tilt threshold, the original reference image may be used for image matching, and image deformation may be considered as relatively large only when the tilt angle is greater than the tilt threshold, the original reference image needs to be transformed for image matching. In this way, also, calculation resources are saved, and calculation efficiency is improved.

In an embodiment, correspondence between the imaging direction angle and the candidate reference images may include:

| Reference image | Tilt angle φ | Azimuth θ |
|---|---|---|
| $IR_0$ | $\left(0° \sim \frac{\arccos(s)}{2}\right)$ | Arbitrary |
| $IR_1$ | $\left(\frac{\arccos(s)}{2} \sim 90°\right)$ | $\left(\alpha_1 - \frac{90°}{M} \sim \alpha_1 + \frac{90°}{M}\right)$ |
| | | $\left(\alpha_1 + 180° - \frac{90°}{M} \sim \alpha_1 + 180° + \frac{90°}{M}\right)$ |
| $IR_2$ | $\left(\frac{\arccos(s)}{2} \sim 90°\right)$ | $\left(\alpha_2 - \frac{90°}{M} \sim \alpha_2 + \frac{90°}{M}\right)$ |
| | | $\left(\alpha_2 + 180° - \frac{90°}{M} \sim \alpha_2 + 180° + \frac{90°}{M}\right)$ |
| . . . | . . . | . . . |
| $IR_M$ | $\left(\frac{\arccos(s)}{2} \sim 90°\right)$ | $\left(\alpha_M - \frac{90°}{M} \sim \alpha_M + \frac{90°}{M}\right)$ |
| | | $\left(\alpha_M + 180° - \frac{90°}{M} \sim \alpha_M + 180° + \frac{90°}{M}\right)$ | where $\alpha_1, \alpha_2 \ldots \alpha_M \ldots$ is an angle between each direction among the M directions and a positive axis of an image abscissa In an embodiment, M=4, s=0.5. The angles between the M different directions and the positive axis of the image abscissa include 0°, 45°, 90°, and 135° with a range of ±22.5°, the tilt angle threshold is 30°. That is, when reducing the original reference image by ½ in the four directions as shown in FIG. 6B, most of requirements for image matching of the detected image in the case of being captured at a large tilt angle can already be satisfied, it is possible to save the number of the extended reference images and the corresponding calculation amount and calculation time.

In an embodiment, the step of determining a rotation vector of a camera based on a relationship between the homography matrix and a camera focal length, a rotation vector of camera external parameters in horizontal and vertical axis directions, a translation vector of camera external parameters may comprise: converting the relationship between the homography matrix and a camera focal length, a rotation vector of camera external parameters in horizontal and vertical axis directions, a translation vector of camera external parameters into two equations:

$$\begin{cases} k^2(N_{11}N_{12} + N_{21}N_{22}) + N_{31}N_{32} = 0 \\ k^2(N_{11}^2 + N_{21}^2 - N_{21}^2 + N_{22}^2) = N_{32}^2 - N_{31}^2 \end{cases};$$

Since there is only one solution parameter for the above two equations, the least squares approach is thus used to solve the above two equations to obtain the parameter k.

In the solving process, if $(N_{11}N_{12}+N_{21}N_{22})$ and $(N_{11}^2+N_{21}^2-N_{12}^2+N_{22}^2)$ are close to 0 (zero), it is determined that the tilt angle φ is 0° and the azimuth θ is 0°.

In an embodiment, the step of determining a rotation vector of a camera based on a relationship between the homography matrix and a camera focal length, a rotation vector of camera external parameters in horizontal and vertical axis directions, a translation vector of camera external parameters comprises: after determining the parameter k, normalizing the column vector $$\begin{pmatrix} kN_{11} \\ kN_{21} \\ N_{31} \end{pmatrix}$$

into an amplitude of 1 (one), thus obtaining an X-axis rotation vector $$\begin{pmatrix} V_{11} \\ V_{21} \\ V_{31} \end{pmatrix}$$

of the camera; normalizing the column vector $$\begin{pmatrix} kN_{12} \\ kN_{22} \\ N_{32} \end{pmatrix}$$

into an amplitude of 1 (one), thus obtaining a Y-axis rotation vector $$\begin{pmatrix} V_{12} \\ V_{22} \\ V_{32} \end{pmatrix}$$

of the camera; and calculating a vector cross-product of $$\begin{pmatrix} V_{11} \\ V_{21} \\ V_{31} \end{pmatrix} \text{ and } \begin{pmatrix} V_{12} \\ V_{22} \\ V_{32} \end{pmatrix},$$

thus obtaining a Z-axis rotation vector $$\begin{pmatrix} V_{13} \\ V_{23} \\ V_{33} \end{pmatrix}$$

of the camera.

In an embodiment, the relationship between the homography matrix and a camera focal length, a rotation vector of camera external parameters in horizontal and vertical axis directions, a translation vector of camera external parameters may include:

$$\begin{bmatrix} N_{11} & N_{12} & N_{13} \\ N_{21} & N_{22} & N_{23} \\ N_{31} & N_{32} & 1 \end{bmatrix} = \frac{1}{W_z} \begin{bmatrix} \frac{1}{k} & 0 & 0 \\ 0 & \frac{1}{k} & 0 \\ 0 & 0 & 1 \end{bmatrix} \begin{bmatrix} V_{11} & V_{12} & W_x \\ V_{21} & V_{22} & W_y \\ V_{31} & V_{32} & W_z \end{bmatrix}$$

where $$\begin{bmatrix} N_{11} & N_{12} & N_{13} \\ N_{21} & N_{22} & N_{23} \\ N_{31} & N_{32} & 1 \end{bmatrix}$$

is the homography matrix, the parameter k is the camera focal length, the parameter $$\begin{bmatrix} V_{11} & V_{12} \\ V_{21} & V_{22} \\ V_{31} & V_{32} \end{bmatrix}$$

is the rotation vector of camera external parameters in horizontal and vertical axis directions, the parameter $$\begin{bmatrix} W_x \\ W_y \\ W_z \end{bmatrix}$$

is the translation vector of camera external parameters, wherein the relationship between the rotation vector of the camera and the imaging direction angle includes:

$$\begin{cases} \varphi = \arccos(V_{33}) \\ \theta = \arctan\left(\frac{V_{23}}{V_{13}}\right) \end{cases},$$

where $\varphi$ is a tilt angle in the imaging direction angle and $\theta$ is an azimuth angle in the imaging direction angle.

In this way, the imaging direction angle of the image during photographing (e.g., the tilt angle $\varphi$ and the azimuth angle $\theta$ included in the imaging direction angle) is calculated by using a homography matrix matched with the previous image, so as to automatically select the most proper extended reference image from among the plurality of extended reference images during image matching for a subsequent frame, so image matching can be achieved only needing to match with one extended reference image, which reduces calculation amount and calculation time, and ensures that the entire system can perform real-time image matching.

Figure 9:
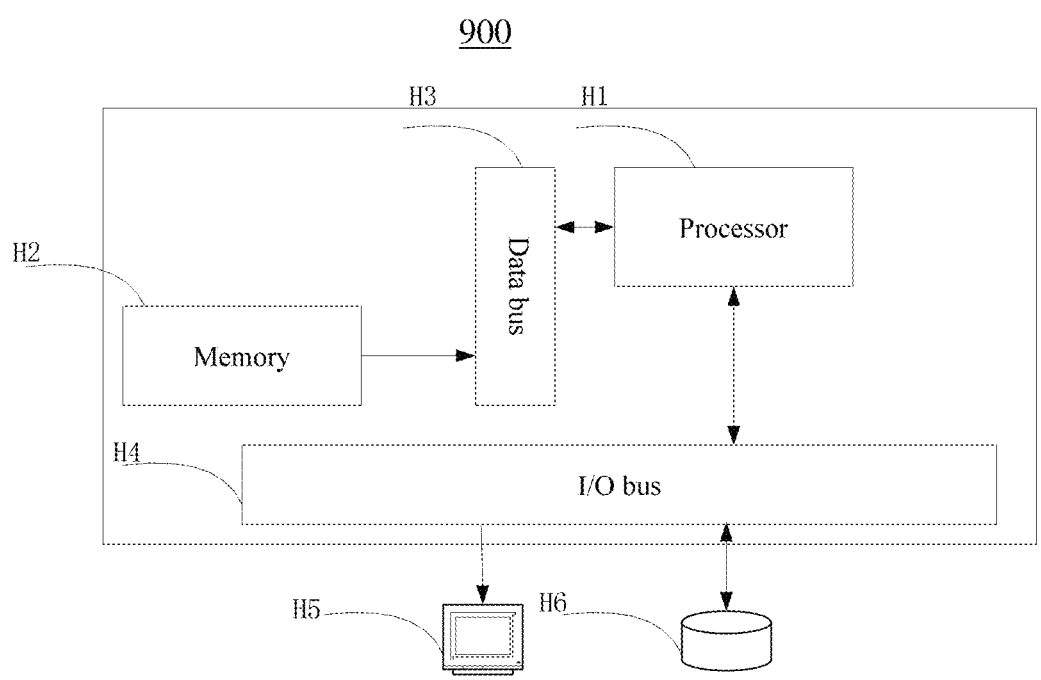
FIG. 9 schematically shows a block diagram of an exemplary computer system/server suitable for implementing the embodiments of the present disclosure.

FIG. 9 schematically shows a block diagram of an exemplary computer system/server suitable for implementing embodiments of the present disclosure.

The computer system 900 shown in FIG. 9 may comprise a processor (H1), a memory (H2) coupled to the processor (H1) and having stored therein computer-executable instructions for executing various steps in the method of FIGS. 2 to 7 when being run by the processor.

The processor (H1) may include, but not limited to, for example, one or more processors or microprocessors or the like.

The memory (H2) may include, but not limited to, for example, random access memory (RAM), read only memory (ROM), flash memory, EPROM memory, EEPROM memory, register, hard disk, floppy disk, solid state disk, removable disc, CD-ROM, DVD-ROM, Blu-ray disc, or the like.

In addition, the computer system may further comprise a data bus (H3), an input/output (I/O) bus (H4), a display (H5), and an input/output device (H6) (e.g., a keyboard, a mouse, a speaker etc.), and so on.

The processor (H1) may communicate with external devices (H5, H6, etc.) via a wired or wireless network (not shown) through the I/O bus (H4).

The memory (H2) may also store at least one computer executable instruction configured to execute steps of respective functions and/or methods in the embodiments described in this technique when being run by the processor (H1).

By adopting the technical means of extending the reference image and using the imaging direction angle to select the optimal reference image, the solution of the present disclosure achieves the effect of reliably performing image matching at a large tilt angle without increasing the calculation amount of image matching, thereby solves the problem of a high failure rate of image matching at a large tilt angle.

Of course, the specific embodiments described above are merely examples and not intended to function as limiting, and a person skilled in the art may, according to the concept of the present disclosure, incorporate and combine some steps and devices in the forgoing separately described embodiments to implement the effect of the present disclosure, such embodiments resulting from incorporations and combinations are also covered by the present disclosure, and will not be described herein in detail.

It is to be noted that the merits, advantages, effects etc. mentioned in the present disclosure are merely illustrative, not restrictive, and these merits, advantages, effects etc. cannot be considered as must be provided by respective embodiments of the present disclosure. In addition, specific details disclosed in the above are for illustrative purposes only and are intended to facilitate understanding, not restrictive, and the foregoing details are not to be construed as limiting that the present disclosure must be implemented with the forgoing specific details.

Block diagrams of the device, apparatus, equipment, system involved in the present disclosure are by way of example only and are not intended to request or imply that connection, arrangement, and configuration must be performed in the manner shown in the block diagrams. As will be appreciated by a person skilled in the art, such device, apparatus, equipment, system may be connected, arranged, and configured in any manner. Words such as "including", "comprising", "having", or the like are open words that refer to "including but not limited to", they can be used interchangeably. Words "or" and "and" used here refer to "and/or", they can be used interchangeably, unless the context clearly dictates otherwise. The word "such as" used here refers to "such as but not limited to", and they may be used interchangeably.

The process flowcharts and the foregoing method descriptions are provided merely as illustrative examples and are not intended to require or imply that steps of the respective embodiments must be performed in the order presented. As will be appreciated by a person skilled in the art, steps in the foregoing embodiments may be performed in any order. Words such as "thereafter", "then", "next", etc. are not intended to limit the order of the steps; these words are simply used to guide the reader through the description of the methods. Further, any reference to elements in the singular, for example, using the articles "a", "an" or "the", is not to be construed as limiting the elements to the singular.

In addition, the steps and devices in the respective embodiments herein are not merely limited to being implemented in a certain embodiment. In fact, the relevant partial steps and partial devices in the respective embodiments herein may be combined according to the concept of the present disclosure to conceive of new embodiments, and these new embodiments are also included in the scope of the present disclosure.

The various operations of the methods described above may be performed by any suitable means capable of performing the corresponding functions. The means may include various hardware and/or software components and/or modules, including but not limited to, hardware circuit, application specific integrated circuits (ASIC), or processor.

General purpose processor, digital signal processor (DSP), ASIC, field programmable gate array signal (FPGA) or other programmable logic device (PLD), discrete gate, transistor logic, discrete hardware component that are designed to perform the functions described herein, or a combination thereof may be utilized to implement or conduct the various illustrated logic blocks, modules, and circuits. The general purpose processor may be a microprocessor, but instead the processor may be any commercially available processor, controller, microcontroller or state machine. The processor may also be implemented as a combination of computing devices, such as a combination of DSP and microprocessor, multiple microprocessors, one or more microprocessors in cooperation with DSP core, or any other such configurations.

Steps of the methods or algorithms described in connection with the present disclosure may be embodied directly in hardware, a software module executed by a processor, or a combination of the two. The software module may reside in any form of tangible storage medium. Some examples of the available storage medium include random access memory (RAM), read only memory (ROM), flash memory, EPROM memory, EEPROM memory, register, hard disk, removable disk, CD-ROM, or the like. The storage medium may be coupled to the processor so that the processor can read information from the storage medium and write information into the storage medium. In an alternative, the storage medium may be integral with the processor. The software module may be a single instruction or many instructions and may be distributed over several different code segments, between different programs, and across multiple storage media.

The methods disclosed herein comprise one or more steps or actions for achieving the described method. The method steps and/or actions may be interchanged with one another without departing from the scope of the claims. In other words, unless a specific order for steps or actions is specified, the order and/or use of specific actions may be modified without departing from the scope of the claims.

The functions described herein may be implemented in hardware, software, firmware, or any combination thereof. If implemented in software, the functions may be stored as one or more instructions on a feasible computer-readable medium. The storage medium may be any feasible medium that can be accessed by a computer. By way of example, rather than limitation, such computer-readable medium may include RAM, ROM, EEPROM, CD-ROM or other optical disk storage, magnetic disk storage or other magnetic storage devices, or any other feasible medium that can be used to carry or store desired program codes in the form of instructions or data structures and that can be accessed by a computer. Disk and disc, as used herein, include compact disc (CD), laser disc, optical disc, digital versatile disc (DVD), floppy disk, and Blu-ray disc, wherein the disk usually reproduces data magnetically, while the disc reproduces data optically with laser.

Thus, a computer program product can carry out the operations presented herein. For example, such a computer program product may be a computer readable tangible medium having instructions stored (and/or encoded) tangibly thereon, the instructions being executable by one or more processors to perform the operations described herein. The computer program product may include packaging material.

Software or instruction may also be transmitted over a transmission medium. For example, the software may be transmitted from a website, server, or other remote source using coaxial cable, fiber optic cable, twisted pair, digital subscriber line (DSL), or wireless technique such as infrared, radio, and microwave.

Further, modules and/or other appropriate means for performing the methods and techniques described herein can be downloaded and/or otherwise obtained by a user terminal and/or base station and/or other manners. For example, such a device can be coupled to a server to facilitate transfer of the means for performing the methods described herein. Alternatively, various methods described herein may be provided via storage means (e.g., RAM, ROM, physical storage medium such as compact disc (CD) or floppy disk, etc.), such that a user terminal and/or a base station can obtain the various methods upon coupling to the device or providing the storage means to the device. Moreover, any other suitable technique for providing the methods and techniques described herein to a device can be utilized.

Other examples and implementations are within the scope and spirit of the present disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. In addition, as used herein, including those used in the claims, "or" contained in item enumeration starting with the term "at least one" refers to separated enumeration, such as an enumeration of "at least one of A, B or C" means A or B or C, or AB or AC or BC, or ABC (i.e., A and B and C). In addition, the phrase "exemplary" does not mean that the described example is preferred or better than other examples.

Various changes, substitutions, and alterations can be made herein without departing from the technique under the teachings as defined by the appended claims. Moreover, the scope of the present disclosure is not intended to be limited to the particular aspects of the process, machines, manufacture, compositions of matter, means, methods and steps described above, the processes, machines, manufacture, compositions of matter, means, methods, or steps, presently existing or later to be developed, that perform substantially the same function or achieve substantially the same result as the corresponding aspects described herein may be utilized. Accordingly, the appended claims are intended to include within their scope such processes, machines, manufacture, compositions of matter, means, methods, or steps.

The preceding description of the disclosed aspects is provided to enable a person skilled in the art to make or use the present disclosure. Various modifications to these aspects will be readily apparent to a person skilled in the art, and the generic principle defined herein may be applied to other aspects without departing from the scope of the present disclosure. Thus, the present disclosure is not intended to be limited to the aspects shown herein but is to be accorded the widest scope consistent with the principle and novel features disclosed herein.

The foregoing description has been presented for the purpose of illustration and description. Furthermore, the description is not intended to limit embodiments of the present disclosure to the form disclosed herein. Although a number of exemplary aspects and embodiments have been discussed above, a person skilled in the art will recognize certain variations, modifications, permutations, additions, and sub-combinations thereof.

The present application claims priority of the Chinese Patent Application No. 201611094077.5 filed on Dec. 1, 2016, the entire disclosure of which is hereby incorporated in full text by reference as part of the present application.

What is claimed is:
1. An image matching method, comprising
an extension step of extending an original reference image into one or more extended reference images, wherein the one or more extended reference images is obtained by deforming the original reference image; and
an image matching set of image-matching a detected image with candidate reference images that include the original reference image and the one or more extended reference images,
wherein the extension step comprises:
obtaining the extended reference images by compressing the original reference image in one or more different directions $\alpha_1, \alpha_2 \ldots \alpha_M$ with s as a compression coefficient, or by magnifying the original reference image in directions $(\alpha_1+90°), (\alpha_2+90°) \ldots (\alpha_M+90°)$ with 1/s as a compression coefficient,
wherein $\alpha_1, \alpha_2 \ldots \alpha_M$ is an angle between each direction among M directions and a positive axis of an image abscissa, M is a positive integer, and s is the compression coefficient.

2. A non-transitory storage medium having executable instructions stored therein, when the executable instructions are run by a processor, the method according to claim 1 is executed.

3. The method according to claim 1, further comprising:
a homography matrix calculation step of calculating, based on a result of the image matching, a homography matrix between the detected image and matched original reference image or extended reference image;
an imaging direction angle determination step of determining, based on the homography matrix, an imaging direction angle of the detected image; and
a selection step of, in a case where image matching is performed on a successive detected image in a next frame, selecting, based on the imaging direction angle, one reference image that corresponds to the imaging direction angle in the candidate reference images as a reference image for image matching.

4. The method according to claim 3, wherein the selection step comprises:
in a case where there is an imaging direction angle obtained for the detected image in a previous frame, selecting one reference image that corresponds to the imaging direction angle in the candidate reference images as a reference image for image matching; and
in a case where there is no imaging direction angle obtained for the detected image in a previous frame, taking the original reference image as a reference image for image matching;
wherein the image matching step comprises:
extracting image features of the detected image and the reference image for image matching; and
performing image matching based on the image features.

5. The method according to claim 3, wherein the homography matrix calculation step comprises:
an adjustment step of, in a case where the detected image and the extended reference image are image-matched, after a homography matrix between the detected image and the matched extended reference image is calculated based on a result of the image matching, adjusting the homography matrix into an adjusted homography matrix between the detected image and the original reference image according to an extension process of the extended reference image.

6. The method according to claim 5, wherein the adjustment step comprises:

$$N_{reg} = N \times \begin{bmatrix} \cos(\alpha) & -\sin(\alpha) & 0 \\ \sin(\alpha) & \cos(\alpha) & 0 \\ 0 & 0 & 1 \end{bmatrix} \times \begin{bmatrix} s & 0 & 0 \\ 0 & 1 & 0 \\ 0 & 0 & 1 \end{bmatrix} \times \begin{bmatrix} \cos(\alpha) & \sin(\alpha) & 0 \\ -\sin(\alpha) & \cos(\alpha) & 0 \\ 0 & 0 & 1 \end{bmatrix} =$$

-continued $$N \times \begin{bmatrix} \dfrac{1+s-(1-s)\cos(2\alpha)}{2} & \dfrac{(s-1)\sin(2\alpha)}{2} & 0 \\ \dfrac{(s-1)\sin(2\alpha)}{2} & \dfrac{1+s+(1-s)\cos(2\alpha)}{2} & 0 \\ 0 & 0 & 1 \end{bmatrix}$$

where $N_{reg}$ is the adjusted homography matrix, N is the homograpy matrix between the detected image and the matched extended reference image, α is an angle between a compression direction of the matched extended reference image and a positive axis of an image abscissa, and s is the compression coefficient of the matched extended reference image in the compression direction.

7. The method according to claim 3, wherein the imaging direction angle determination step comprises:
determining a rotation vector of a camera based on a relationship between the homography matrix and a camera focal length, a rotation vector of camera external parameters in horizontal and vertical axis directions, a translation vector of camera external parameters; and
determining the imaging direction angle based on the rotation vector of the camera and according to a relationship between the rotation vector of the camera and the imaging direction angle.

8. The method according to claim 7, wherein the relationship between the homography matrix and a camera focal length, a rotation vector of camera external parameters in horizontal and vertical axis directions, a translation vector of camera external parameters comprises:

$$\begin{bmatrix} N_{11} & N_{12} & N_{13} \\ N_{21} & N_{22} & N_{23} \\ N_{31} & N_{32} & 1 \end{bmatrix} = \dfrac{1}{W_z} \begin{bmatrix} \dfrac{1}{k} & 0 & 0 \\ 0 & \dfrac{1}{k} & 0 \\ 0 & 0 & 1 \end{bmatrix} \begin{bmatrix} V_{11} & V_{12} & W_x \\ V_{21} & V_{22} & W_y \\ V_{31} & V_{32} & W_z \end{bmatrix}$$

wherein $$\begin{bmatrix} N_{11} & N_{12} & N_{13} \\ N_{21} & N_{22} & N_{23} \\ N_{31} & N_{32} & 1 \end{bmatrix}$$

is the homography matrix, the parameter k is the camera focal length, the parameter $$\begin{bmatrix} V_{11} & V_{12} \\ V_{21} & V_{22} \\ V_{31} & V_{32} \end{bmatrix}$$

is the rotation vector of camera external parameters in horizontal and vertical axis directions, the parameter $$\begin{bmatrix} W_x \\ W_y \\ W_z \end{bmatrix}$$

is the translation vector of camera external parameters, the relationship between the rotation vector of the camera and the imaging direction angle includes:

$$\begin{cases} \varphi = \arccos(V_{33}) \\ \theta = \arctan\left(\dfrac{V_{23}}{V_{13}}\right) \end{cases},$$

wherein φ is a tilt angle in the imaging direction angle and θ is an azimuth angle in the imaging direction angle.

9. The method according to claim 8, wherein the one or more extended reference images $IR_1$, $IR_2$ . . . $IR_M$ are obtained by compressing the original reference image $IR_0$ with a coefficient s in M different directions, M ing a positive integer,
wherein a correspondence between the imaging direction angle and the candidate reference images includes:
the imaging direction angle at which the tilt angle φ is less than or equal to a tilt angle threshold corresponds to the original reference image $IR_0$;
when the tilt angle φ is greater than the tilt angle threshold and the azimuth θ falls into one of the M different directions and a vicinity range thereof, the imaging direction angle corresponds to the extended reference image to which said one direction among the M different directions corresponds.

10. The method according to claim 9, wherein the correspondence between the imaging direction angle and the candidate reference images includes:

| Reference image | Tilt angle φ | Azimuth θ |
|---|---|---|
| $IR_0$ | $\left(0° \sim \dfrac{\arccos(s)}{2}\right)$ | Arbitrary |
| $IR_1$ | $\left(\dfrac{\arccos(s)}{2} \sim 90°\right)$ | $\left(\alpha_1 - \dfrac{90°}{M} \sim \alpha_1 + \dfrac{90°}{M}\right)$ $\left(\alpha_1 + 180° - \dfrac{90°}{M} \sim \alpha_1 + 180° + \dfrac{90°}{M}\right)$ |
| $IR_2$ | $\left(\dfrac{\arccos(s)}{2} \sim 90°\right)$ | $\left(\alpha_2 - \dfrac{90°}{M} \sim \alpha_2 + \dfrac{90°}{M}\right)$ $\left(\alpha_2 + 180° - \dfrac{90°}{M} \sim \alpha_2 + 180° + \dfrac{90°}{M}\right)$ |
| . . . | . . . | . . . |
| $IR_M$ | $\left(\dfrac{\arccos(s)}{2} \sim 90°\right)$ | $\left(\alpha_M - \dfrac{90°}{M} \sim \alpha_M + \dfrac{90°}{M}\right)$ $\left(\alpha_M + 180° - \dfrac{90°}{M} \sim \alpha_M + 180° + \dfrac{90°}{M}\right)$ | wherein $\alpha_1$, $\alpha_2$ . . . $\alpha_M$ (M is an angle between each direction among M directions and a positive axis of an image abscissa.

11. The method according to claim 9, wherein M=4, s=0.5, the angle between each direction among the M different directions and the positive axis of an image abscissa includes 0°, 45°, 90°, and 135° with a range of 22.5°, and the tilt angle threshold is 30°.

12. The method according to claim 8, wherein determining a rotation vector of a camera based on a relationship between the homography matrix and a camera focal length, a rotation vector of camera external parameters in horizontal and vertical axis directions, a translation vector of camera external parameters comprises:

converting the relationship between the homography matrix and a camera focal length, a rotation vector of camera external parameters in horizontal and vertical axis directions, a translation vector of camera external parameters into two equations:

$$\begin{cases} k^2(N_{11}N_{13} + N_{21}N_{22}) + N_{31}N_{32} = 0 \\ k^2(N_{11}^2 + N_{21}^2 - N_{12}^2 + N_{22}^2) = N_{32}^2 - N_{31}^2 \end{cases};$$

using least squares approach to solve the above two equations to obtain parameter k;

during solving process, if $(N_{11}N_{12}+N_{21}N_{22})$ and $(N_{11}^2+N_{21}^2-N_{12}^2+N_{22}^2)$ are close to 0 (zero), determining that the tilt angle $\varphi$ is 0° and the azimuth $\theta$ is 0°.

13. The method according to claim 9, wherein determining a rotation vector of a camera based on a relationship between the homography matrix and a camera focal length, a rotation vector of camera external parameters in horizontal and vertical axis directions, a translation vector of camera external parameters comprises:

after the parameter k is determined, normalizing column vector $$\begin{pmatrix} kN_{11} \\ kN_{21} \\ N_{31} \end{pmatrix}$$

into an amplitude of 1 (one), thus obtaining an X-axis rotation vector $$\begin{pmatrix} V_{11} \\ V_{21} \\ V_{31} \end{pmatrix}$$

of the camera;

normalizing column vector $$\begin{pmatrix} kN_{12} \\ kN_{22} \\ N_{32} \end{pmatrix}$$

into an amplitude of 1 (one), thus obtaining a Y-axis rotation vector $$\begin{pmatrix} V_{12} \\ V_{22} \\ V_{32} \end{pmatrix}$$

of the camera; and calculating a vector cross-product of $$\begin{pmatrix} V_{11} \\ V_{21} \\ V_{31} \end{pmatrix} \text{ and } \begin{pmatrix} V_{12} \\ V_{22} \\ V_{32} \end{pmatrix},$$

thus obtaining a Z-axis rotation vector $$\begin{pmatrix} V_{13} \\ V_{23} \\ V_{33} \end{pmatrix}$$

of the camera.

14. An image matching apparatus, comprising:
an extension unit configured to extend an original reference image into one or more extended reference images, wherein the one or more extended reference images is obtained by deforming the original reference image; and
an image matching unit configured to image-match a detected image with candidate reference images that include the original reference image and the one or more extended reference images,
wherein the extension unit is further configured to obtain the extended reference images by compressing the original reference image in one or more different directions $\alpha_1, \alpha_2 \ldots \alpha_M$ with s as a compression coefficient, or by magnifying the original reference image in directions $(\alpha_1+90°), (\alpha_2+90°) \ldots (\alpha_M+90°)$ with 1/s as a compression coefficient,
wherein $\alpha_1, \alpha_2 \ldots \alpha_M$ is an angle between each direction among M directions and a positive axis of an image abscissa, M is a positive integer, and s is the compression coefficient.

15. An image matching system, comprising:
a processor;
a memory coupled to the processor and having executable instructions stored therein, when the executable instructions are run by the processor, an image matching method comprising the following steps is executed;
an extension step of extending an original reference image into one or more extended reference images, wherein the one or more extended reference images is obtained by deforming the original reference image; and
an image matching step of image matching a detected image with candidate reference images that include the original reference image and the one or more extended reference images,
wherein the extension step comprises:
obtaining the extended reference images by compressing the original reference image in one or more different directions $\alpha_1, \alpha_2 \ldots \alpha_M$ with s as a compression coefficient, or by magnifying the original reference image in directions $(\alpha_1+90°), (\alpha_2+90°) \ldots (\alpha_M+90°)$ with 1/s as a compression coefficient,
wherein $\alpha_1, \alpha_2 \ldots \alpha_M$ is an angle between each direction among M directions and a positive axis of an image abscissa, M is a positive integer, and s is the compression coefficient.

* * * * *